(12) United States Patent
Maul et al.

(10) Patent No.: US 7,387,830 B2
(45) Date of Patent: Jun. 17, 2008

(54) COATING AGENT, METHOD AND COATED SUBSTRATE SURFACE

(75) Inventors: Robert Maul, Winkelhaid (DE); Alfried Kiehl, Schnaittach (DE); Otto W. Gordon, Apples (CH); Kàroly Donders, Ostermundingen (CH)

(73) Assignee: Eckart GmbH & Co. Kg., Furth (DE)

( * ) Notice: Subject to any disclaimer, the term of this patent is extended or adjusted under 35 U.S.C. 154(b) by 0 days.

(21) Appl. No.: 10/516,670

(22) PCT Filed: May 22, 2003

(86) PCT No.: PCT/DE03/01647

§ 371 (c)(1),
(2), (4) Date: Jun. 20, 2005

(87) PCT Pub. No.: WO03/002090

PCT Pub. Date: Dec. 11, 2003

(65) Prior Publication Data

US 2005/0260352 A1    Nov. 24, 2005

(30) Foreign Application Priority Data

May 29, 2002  (DE)  ................. 102 24 109
Jun. 11, 2002  (DE)  ................. 102 25 979

(51) Int. Cl.
*B32B 5/16*    (2006.01)
(52) U.S. Cl. ............... 428/323; 428/328; 428/331; 428/403; 428/405; 428/407
(58) Field of Classification Search ........... 428/323, 428/328, 331, 403, 405, 407
See application file for complete search history.

(56) References Cited

FOREIGN PATENT DOCUMENTS

| DE | 37 39 332 A1 | 6/1989 |
|---|---|---|
| DE | 43 19 669 A1 | 1/1994 |
| DE | 690 15 199 T2 | 5/1995 |
| DE | 195 01 307 A1 | 7/1996 |
| DE | 195 20 312 A1 | 12/1996 |
| DE | 198 20 112 A1 | 11/1999 |
| DE | 100 04 499 A1 | 8/2001 |
| EP | 0 259 592 | 7/1987 |
| EP | 0 113 150 | 4/1988 |
| EP | 0 280 749 | 9/1988 |
| EP | 0 416 369 A2 | 8/1990 |
| EP | 0 477 433 A2 | 12/1990 |
| EP | 0 632 109 B1 | 6/1994 |
| EP | 0 491 773 B1 | 12/1994 |
| EP | 0 717 088 A2 | 6/1996 |
| EP | 0717088 A2 * | 6/1996 |
| EP | 1 084 198 B1 | 5/1999 |
| WO | WO 91/04305 | 4/1991 |
| WO | WO 93/08006 | 4/1993 |
| WO | WO 98/22539 | 5/1998 |

OTHER PUBLICATIONS

"Natural finishes for exterior timber", Pigment and Resin Technology, Apr. 1986, pp. 10-14.
Jurgen Sell and Kurt Weiss, Curt R. Vincentz Verlag—"Apparat fur die kunstliche Bewitterung von Holz und Holzanstrichen", print from Farbe und Lack, Jun. 1989, pp. 417-418.
H.Pecina/o. Paprzycki, Curt R. Vincentz Verlag, "Lack auf Holz: Einflussgroben und Wechselwirkungen", Hannover, 1995, publisher: Ulrich Zorll, p. 144.
A. Kiehl and K. Griewe, "Encapsulated aluminum pigments", Progress in Organic Coatings vol. 37, pp. 179-183 -(1999) 7 pages.
Dr. Juan-Antonio Gonzalez-Gomez, UV Schutz; Sachtleben Symposium "Transparente Eisenoxide (TEO) als UV-Absorber in Holzlasuren", Aug. 6, 2000, pp. 1-37.
DI Walter Zoller, BU Pigmente New Systems, Sachtleben Symposium, "Farbmittel fur wassrige Holzbeizen und Holzschutz" Jun. 2000, pp. 1-24.

* cited by examiner

*Primary Examiner*—Leszek Kiliman
(74) *Attorney, Agent, or Firm*—Synnestvedt & Lechner LLP

(57) ABSTRACT

The invention concerns a coating agent for cellulose-bearing substrate surfaces comprising a liquid phase and binding agent, wherein the coating agent includes platelet-shaped pigments and a bonding agent, wherein the platelet-shaped pigments are corrosion-resistant and impermeable to UV light and wherein the bonding agent produces a bond between pigment, binding agent and the cellulose-bearing substrate surface. The invention further concerns the use of the coating agent according to the invention as well as coated cellulose-bearing substrate surfaces.

37 Claims, No Drawings

COATING AGENT, METHOD AND COATED SUBSTRATE SURFACE

CROSS REFERENCE TO RELATED APPLICATIONS

This application claims the priority of PCT Application No. PCT/DE03/01647 filed on May 22, 2003, of German Patent Application No. 102 24 109.0, filed on May 29, 2002, and of German Patent Application No. 102 25 979.8, filed Jun. 11, 2002, the contents of which are hereby incorporated by reference.

The invention concerns a coating agent for cellulose-bearing substrate surfaces comprising a liquid phase and a binding agent. The invention further concerns the use of the coating agent and substrate surfaces coated with the coating agent.

Wood experiences major surface changes when exposed to open-air weathering and as a result acquires an irregular appearance which manifests itself in brown spots and later in irregular graying. In the long term unprotected wood is completely destroyed by weathering influences. The destruction of wood by weathering influences is to be attributed inter alia to water or moisture, ultraviolet light, oxygen, fungi and animal pests.

It is known from the article 'Natural finishes for exterior timber' in Pigment and Resin Technology, April 1986, pages 10 ff, that wood which is exposed to rain and sunlight loses its original color. That is to be attributed in part to the extraction of water-soluble components, in particular however to the breakdown of lignin and other components in the wood due to the influence of the UV radiation component in sunlight. In practice it is repeatedly found that damage occurs in particular when a number of influences are operative at the same time.

It is known from EP 0 113 150 for substrates containing wood or wood fibers to be coated with an oxidatively drying coating agent based on alkyd resins.

WO 91/04305 describes a water-repellent coating composition which inter alia contains water-soluble metal complex cross-linking agents. This involves in particular ammonium zirconium carbonate. In addition the coatings may contain waxes for further hydrophobisation. That coating composition however suffers from the disadvantage of not affording protection for wood from UV light.

A transparent hydrophobic wood coating dispersion based on organofunctional silanes is described in WO 93/08006 which however by virtue of transparency does not afford satisfactory long-term protection against UV light.

Wood coating materials also involve the use of UV absorbers, for example transparent iron oxides [Symposium by Sachtleben, UV-Schutzmittel 2000] which keep a part of the UV light away from the wood but which do not offer complete and long-term protection from UV light. Further UV-protection means are stearically hindered amines (HALS) from Ciba Geigy [Symposium by Sachtleben, UV-Schutzmittel 2000].

WO 98/22539 also discloses nano-scale core-shell Si-particles as UV light absorbers. Those particles are of a diameter of less than 500 nm. By virtue of suitable thicknesses for the Si core and the enclosure the UV absorption of those particles can be adapted to the radiated UV light. Those particles behave transparently in relation to the wavelength of electromagnetic radiation in the visible range (400-700 nm).

Platelet-shaped metal pigments can orient themselves in a coating in parallel relationship with the substrate. With a sufficiently high pigmentation level it is possible to achieve complete covering in relation to the substrate.

In that respect, aluminum pigments without a corrosion-resistant coating are not suitable for coating wood for exterior uses as the influence of moisture in the wood means that the aluminum pigments suffer corrosion with time and finally dissolve to form aluminum oxide. That is disadvantageous in particular when the aluminum pigments of the coating are also intended to impart a decorative effect as corrosion entails an optical graying effect.

A very significant aspect is the adhesion of the metal pigments in the coating. Platelet-shaped metal pigments always represent a disturbance in the coating. That can result in adhesion problems in particular under the effect of water. DE 198 20 112 describes how adhesion problems of that kind in respect of effect pigments can be resolved by a suitable surface modification. The surface modification is implemented with bifunctional additives. They have on the one hand suitable anchor groups for bonding to the effect pigment and on the other hand suitable terminal functional groups which permit bonding to the binding agent of the lacquer.

The object of the invention is to provide reliable and long-term weathering protection for cellulose-bearing surfaces, in particular wood-bearing and wood fiber-bearing substrates.

In particular the invention seeks to provide a coating agent for the production of a coating which affords long-term protection in relation to UV light.

The object of the invention is attained by a coating agent for cellulose-bearing substrate surfaces comprising a liquid phase and a binding agent in accordance with claim 1. The binding agent according to the invention includes platelet-shaped pigments and a bonding agent, wherein the platelet-shaped pigments are corrosion-resistant and impermeable to UV light and wherein the bonding agent creates a bond between platelet-shaped pigments, binding agent and the cellulose-bearing substrate surface.

Advantageous developments of the invention are set forth in appendant claims 2 through 24.

The object of the invention is further attained by the use of a coating agent as set forth in one of claims 1 through 24 for coating cellulose-bearing substrate surfaces, preferably wood, materials containing wood chips, in particular building materials, or paper or paper-bearing materials.

A preferred development of the invention is recited in appendant claim 26.

The object of the invention is further attained by a cellulose-bearing substrate surface coated with a coating agent as set forth in one of claims 1 through 24.

A preferred embodiment is recited in claim 28.

The coating agent according to the invention provides extremely effectively UV protection. The use of pigments which are impermeable to UV light provides for reliable protection for the cellulose-bearing surface of a substrate, for example wood, in relation to UV light. In that respect the coating agent has a content of platelet-shaped pigments, and that results in the substrate surface which is to be protected being completely covered. In that case the platelet-shaped pigments preferably arrange themselves in mutually adjoining relationship and/or in overlapping form, that is to say in scale-like fashion, on the substrate surface.

In general terms corrosion-resistant, opaque, platelet-shaped pigments which are impermeable both in relation to visible light and also UV light are suitable.

The use of a bonding agent which provides a bond between platelet-shaped pigments, binding agent and the cellulose-bearing substrate surface provides that the platelet-shaped pigments are surprisingly reliably fixed on the substrate surface. It has been found that a coating produced using the coating agent according to the invention is extremely stable and resistant under open-air weathering conditions over a period of several years, for example more than between five and six years. This surprising stability of the coating is attributed to the excellent bond between the platelet-shaped pigments, the cellulose-bearing surface and the binding agent.

The coating agent according to the invention is excellently suitable both as a primer or undercoat to which one or more coloring coating or coatings can be subsequently applied and also as a top coat for cellulose-bearing surfaces.

The coating produced using the coating agent according to the invention represents both extremely effective protection for the surface of the cellulose-bearing substrate in relation to UV radiation and also in relation to damage due to wet. In addition it has surprisingly been found that such a coating does not involve cracking upon expansion of the cellulose-bearing substrate, for example wood, due to thermal influences, or because of swelling by virtue of the absorption of moisture or water.

Surprisingly the coating produced using the coating agent according to the invention has vapor openness or vapor permeability. That vapor permeability permits the discharge of moisture which is in the cellulose-bearing substrate or between the substrate surface and the applied coating. That extremely advantageously prevents a pressure build-up under the coating and accordingly avoids the coating peeling off or coming away. The vapor-open coating applied to a substrate surface using the coating agent according to the invention consequently has a micro- or nano-porous structure which is permeable to water vapor.

It is preferred if the platelet-shaped pigments are metal pigments with a corrosion-resistant coating.

Metal pigments have been found to be highly suitable in the coating agent according to the invention. Metal pigments are impermeable to UV light, having regard to their thickness and their UV reflection capability. In addition heat radiation is also reflected by those pigments. Accordingly cellulose-bearing substrate surfaces, for example building materials of wood or wood fibers, for example chipboard or fiber panels, are protected from UV light and heat radiation (IR radiation). Reflection of the heat radiation means that there is a lesser degree of thermal heating of the coated material, than without such a coating. In that respect the coated material is also suitable as heat protection or barrier material. Corrosion-resistantly coated aluminum pigments have proven to be highly suitable.

It is further preferred if the corrosion-resistant coating is selected from the group which consists of aluminum oxide layer, silicate layer, preferably an $SiO_2$ layer produced using sol-gel processes (that is to say $SiO_2 \times nH_2O$), chromium oxide layer [EP 0 159 592] acrylate layer [EP 0 416 369], aluminum oxide layer [DE 195 20 312] and layers thereof arranged one above the other.

Coatings of that kind were preferably developed to be able to use corrosion-sensitive metal pigments such as aluminum or zinc pigments in aqueous formulations.

Unprotected aluminum pigments for example react, forming hydrogen (gassing). In regard to aluminum the man skilled in the art is aware of a number of processes for providing the pigments with protecting, three-dimensional protective layers.

Coatings of silicate are preferred. In accordance with the invention the term 'silicate' is used to denote both a substantially purely crystalline $SiO_2$ coating and also in particular a water-bearing $SiO_2$ layer produced using a sol-gel process, that is to say $SiO_2 \times nH_2O$, as described in A Kiehl and K Greiwe, Progress in Organic Coatings 37, 1999, 179.

In particular metal pigments have proven to be highly suitable. Metal pigments coated with oxide layers, for example aluminum oxide, chromium oxide or silicate, preferably a $SiO_2$ layer produced using a sol-gel process (that is to say $SiO_2 \times nH_2O$), have in the oxide layer a sufficient number of hydroxyl groups which can react or interact with a bonding agent like the metal complexes described hereinafter and/or a functional organosilane.

In addition there is the possibility of additionally influencing the pigment surface by suitable surface modifying agents—as described in DE 198 20 112 A1 and EP 1 084 198 A1. Thus in particular chemical functionalities can be applied to the surface of the above-specified corrosion-resistant coatings, which permit good bonding of the pigment surface to the metal complex and/or the binding agent and thus improved adhesive strength in respect of the metal pigment in the applied coating.

In a further development according to the invention colored aluminum pigments as are described in DE 195 01 307 can also be used. Here color pigments are incorporated into the silicate coating and thus fixed to the surface of the aluminum pigment. Those pigments permit further color variations in the coating composition according to the invention.

The foregoing coatings enclose the metal pigments substantially completely and preferably completely. In that way the metal pigments are reliably protected from corroding influences, in particular moisture.

In accordance with a further preferred embodiment the metal pigments are produced from metals which are selected from the group which consists of aluminum, zinc, tin, copper, iron, titanium, steel and alloys thereof, preferably gold-bronze.

The coated metal pigments used are preferably coated pigments consisting of aluminum and alloys thereof and/or zinc and alloys thereof. Aluminum pigments are particularly preferred.

Platelet-shaped metal pigments of that kind orient themselves in parallel relationship with the substrate in the coating. The thickness of the metal pigments which is between about 100 nm and 500 nm is so high that neither UV radiation nor IR radiation can be transmitted. Therefore the preferably overlapping scale-like arrangement of the metal pigments after application of the coating agent according to the invention to a cellulose-bearing substrate provides practically complete UV protection for the subjacent substrate. In particular aluminum pigments have a high level of IR radiation reflectivity. In that way the heat which is radiated in can be well emitted to the ambient atmosphere. The coating suffers less from cracking caused by excessively severe temperature changes, as is described by way of example in 'Lack auf Holz: Einflussgrössen und Wechselwirkungen', H Pecina/O Paprzycki, Curt R Vincentz Verlag, Hannover, 1995, editor Ulrich Zorll, page 114.

The corrosion-resistant coating of the platelet-shaped pigments comprising the above-mentioned materials is usually of a layer thickness in a range of between 5 nm and 400 nm, preferably between 10 nm and 150 nm. Such platelet-shaped pigments have hitherto not yet been used in wood protection formulations.

The coated metal pigments which are used in accordance with the invention and which are employed for UV protection for cellulose-bearing substrates are substantially circular or oval and are preferably of a maximum diameter of between 1 µm and 250 µm, preferably between 5 µm and 70 µm.

The use of metal pigments in the coating agent according to the invention provides a metallic appearance after being applied to wood materials. Wood materials which are coated in that way and accordingly protected in relation to weathering influences, for example wood panels, boards or wood posts, are excellently well suitable as facade claddings instead of metal panels, steel bearers, Eternit claddings or mineral building materials.

In industrial building modern architecture is increasingly going back to the building material wood. That manifests itself in the use of laminate wood panels, wafer board, plywood panels, through to chipboard. In comparison with mineral panels such as Eternit or metallic panels such as aluminum or zinc, systems consisting of wood generally have to be coated. The coating systems for wood facades, which are known at the present time, afford protection for a maximum of 5 years. After that re-treatment of the wood is necessary. The coating agent according to the invention protects wood or wood-like substrates for longer than between 5 and 6 years in open-air weathering conditions. The wood building materials coated with the coating agent according to the invention are therefore available for use in industrial building.

A great advantage of wood systems protected in that way in industrial facade building is the lower price of the overall system, improved thermal space properties when using the coated wood materials, the availability of wood in heavily wooded areas and the fact that wood is a renewable raw material and that the building materials coated in accordance with the invention contain metal only in very small amounts, for example in the form of metal pigments.

Preferably the metal pigments used are silicate-coated aluminum, zinc, tin, copper, iron, titanium, steel or goldbronze pigments.

In accordance with a preferred embodiment the bonding agent is a metal complex with one or more organic ligands, wherein the metal complex, as a central ion or ions, contains one or more metal cations, which are selected from the group consisting of B, Al, Si, Ge, Sn, Pb, Ti, Zr, V, Cr, Mo, Mn, Fe, Zn and mixtures thereof, and the metal complex has at least two functional groups or ligands which form a complex with hydroxyl groups or provide a covalent bond or are displaced out of the complex by hydroxyl groups, producing an oxygen-central cation bond.

It is further preferred that at least two hydrolysable inorganic or organic ligands or two hydroxyl ions are co-ordinated on the one metal cation or the plurality of metal cations of the metal complex.

Inorganic ligands, for example halogeno, preferably chloro, carbonato, hydrogencarbonato etc or organic ligands, for example alkoxy ligands such as for example methoxy, ethoxy, propoxy, isopropoxy, butoxy and so forth can be used as hydrolysable ligands.

It is further preferred if at least one organic ligand is co-ordinated on the one metal cation or the plurality of metal cations of the metal complex by way of a carboxyl group or a plurality of carboxyl groups.

In particular fatty acids with between 3 and 30 carbon atoms have been found to be highly suitable for that purpose. It is possible to use mono- or dicarboxylic acids or however also polycarboxylic acids.

Preferably at least one organic ligand is hydrophobic.

For example it is possible to use alkyl, aryl, alkylaryl and/or arylalkyl ligands. Preferably waxes or fatty acids with at least 9 and further preferably with at least 12 carbon atoms as well as silicones are used.

It is further preferred if at least one organic ligand has at least one functional group which can react with optional constituents of the coating agent. That ligand can additionally also have the above-mentioned hydrophobic properties. Thus this may involve for example a fatty acid with a reactive group or functionality. That reactive group or functionality can be reacted with amino-functionalised silicones, whereby the hydrophobicity of the ligand is further increased.

In accordance with a preferred development of the invention the metal complex can be obtained by the following steps:

(a) neutralising a carboxyl group-bearing compound which has between 3 and 30 carbon atoms, preferably between 9 and 24 carbon atoms, with a volatile basic nitrogen compound, preferably ammonia and/or a volatile amino compound, (b) adding at least one water-soluble salt of a metal which is selected from the group consisting of B, Al, Si, Ge, Sn, Pb, Ti, Zr, V, Cr, Mo, Mn, Fe, Zn and mixtures thereof, to the mixture from step (a), and (c) optionally adding a volatile basic nitrogen compound, preferably ammonia and/or a volatile amine compound, to the mixture from step (b).

In step (a) the carboxyl group-bearing compound used can be both a mono-, di- or polycarboxylic acid and also a mixture thereof. Preferably a monocarboxylic acid is used. Carboxyl group(s)-bearing wax, fatty acid or silicone resin with a carboxyl group have also been found to be suitable. The carboxyl group provides for co-ordination of the carboxyl group(s)-bearing compound on the metal cation and accordingly fixing in the complex and thus in the applied coating.

The carboxyl group(s)-bearing compound used, preferably a monocarboxylic acid, is preferably neutralised with ammonia or a volatile amine. The volatile amine used can be for example aminomethylpropanol, diethanolamine, triethanolamine etc.

The neutralised mixture produced in step (a) is mixed with a water-soluble metal salt of B, Al, Si, Ge, Sn, Pb, Ti, Zr, V, Cr, Mo, Mn, Fe, Zn and mixtures thereof in an aqueous environment, whereupon a metal complex is obtained.

In that respect it is also possible to produce mixed metal complexes with various cations of the above-mentioned metals and to use them in the production of the coating agent according to the invention.

Preferably complexes with Si, Al, Zr and/or Ti as central cations are used. By way of example ammonium zirconium carbonate can be used as the soluble metal salt.

In addition it is possible to use the coupling reagents disclosed in European patent No 0 632 109 B1, for example zirconium aluminates, in the production of the coating agent according to the invention. Those coupling reagents can be obtained in accordance with EP 0 632 109 B1 under the designation MANCHEM®, from MANCHEM LIMITED, Ashton New Road, Clayton, Manchester, M11 4AT, England.

In addition the metal complex-cross-linking agents described in European patent No 0 491 773 B1 can also be used in the production of the coating agent according to the invention.

A particularly suitable, heavily hydrophobised metal complex is the HF-200 complex which can be obtained from Böhme AG, Bernische Lack-und Farbenfabrik, Stationsstrasse 37, 3097 Liebefeld, Switzerland.

The metal complex with a bonding agent effect extremely advantageously provides both for adhesion to the binding agent, to the cellulose-bearing substrate surface, and also to the surface of the platelet-shaped pigment, preferably metal pigment, forming a stable and resistant composite.

The mechanism of the surprising bonding effect of the above-described metal complex has not yet been clarified. It is assumed that the ligands of the metal complex are reacted with the hydroxyl groups of the cellulose in the cellulose-bearing substrate surface. For example ligands of the metal complex can hydrolyse under aqueous conditions and result in hydroxyl ions which are co-ordinated on the central cation of the metal complex and which subsequently condense with the hydroxyl groups of the cellulose. It is however also possible to use metal complexes which already have hydroxyl ions co-ordinated on the central cation. Those hydroxyl ions which are co-ordinated on the central cation, with the hydroxyl ions of the cellulose, can bind the metal complex to the cellulose by way of an oxygen bridge, with water being separated off. It is also possible to use metal complexes in which the hydroxyl group of the cellulose displaces the ligands out of the metal complex. The metal complex can also be bound to the hydroxyl groups of the cellulose by way of hydrogen bridge bonds.

By virtue of their nature the platelet-shaped pigments have hydroxyl groups at the surface or at the surface of the corrosion-resistant coating, which, as described hereinbefore in regard to the interaction or reaction with the hydroxyl groups of the cellulose, interact or react similarly with the metal complex.

Preferably the platelet-shaped pigments, preferably metal pigments, are coated with at least one corrosion-resistant coating which has reactive groups. It will be appreciated that it is also possible for the surface of the platelet-shaped pigments or the surface of corrosion-resistantly coated platelet-shaped pigments, for example of silicate-coated metal pigments, to be provided with reactive orientation agents, as are described in DE 198 20 112, the disclosure of which is hereby incorporated by reference. An OH group, a silanol group, an acrylate group, a methacrylate group, an amino group, and so forth can be specified as examples.

Platelet-shaped pigments coated in that way, preferably metal pigments, react easily with the bonding agent, preferably metal complex and/or a functionalised organosilane (see below), in the coating agent according to the invention.

In accordance with a further embodiment of the invention the bonding agent can be a functionalised organosilane $R_nSiX_{4-n}$, wherein n=between 0 and 2 and R stands for a substituted or unsubstituted organic residue, preferably alkyl, aryl, alkylaryl or arylalkyl, and X stands for functional groups and/or for substituted or unsubstituted organic residues which form complexes with hydroxyl groups and/or react with hydroxyl groups, forming a covalent bond, and/or are displaced by hydroxyl groups out of the organosilane, forming an oxygen-silicon bond. Preferably a mixture comprising various functionalised organosilanes is used.

It is further preferred if a metal complex and a functionalised organosilane is contained in the coating agent as a bonding agent.

It has been found that the use of metal complex and functionalised organosilane leads to a further improvement in the physical properties.

The coating agent according to the invention can be built up both on an aqueous basis, optionally with the addition of organic solvent, and also on a purely solvent-bearing basis. However, particularly preferred for ecological reasons are aqueous systems which preferably substantially comprise water and which contain only slight amounts of organic solvent.

A preferred development according to the invention provides for using metal complexes with silicon, titanium, zirconium and aluminum cations as the central cations. It has surprisingly been found that metal complexes with those metal cations give a particularly marked improvement in rapid weathering tests. Those metal complexes are particularly well suited, by virtue of reaction with the hydroxyl groups of the cellulose, to providing good adhesion to the substrate surface, bonding functionalities on the pigment surface, and possibly reacting with the binding agents in the coating agent.

In that way an excellent bonding join is achieved between all components of the coating. In particular the platelet-shaped pigments, preferably metal pigments, are reliably anchored in the coating. That is advantageous in particular if bonding agent which is over the metal pigments should be broken down with the passage of time under the action of UV and moisture.

A further effect of those metal complexes is additional hydrophobisation of the coating. Hydrophobisation is further improved if the metal complex has a ligand with a long-chain, branched or unbranched alkyl residue. For example the ligand can be a monocarboxylic acid with 9 or more carbon atoms, such as for example with 16 carbon atoms (palmitic acid) or 18 carbon atoms (stearic acid). Fatty acids of that kind have already long been used in wood protection coatings for hydrophobisation purposes, in a form of being neutralised by amines. A disadvantage in that respect hitherto is that those salts can be washed out with the passage of time under the influence of water on the coating. Accordingly the hydrophobisation effect of the coating decreases with time and corrosion processes increasingly occur.

By virtue of complexing of the fatty acid preferably used by way of the carboxyl group on the metal cation, the fatty acid is fixed in the coating and reliably hydrophobises the substrate surface.

In a further embodiment according to the invention the hydrophobic properties of the metal complexes can be improved by reacting one or more ligands with suitably functionalised silicone oils or resins. The functionalised silicone oils are for example aminofunctional silicone oils, silicone resins or carboxylfunctional waxes.

Examples of such silicone oils and waxes are as follows: Dow-Corning® 2-9034 (non-ionogenic organosilicone emulsion), Baysilone® (which can be obtained from Bayer AG, Leverkusen, Germany), Crodasil series (which can be obtained from Croda Resins Ltd), Silikophen series (which can be obtained from Tego, Essen, Germany), Ceridust, Licowax (which can be obtained from Clariant GmbH, Germany).

The term binding agents which are contained in the coating agent is used to denote conventional binding agents which are provided with given functional groups. These may involve for example monomer functionalities such as for example methacrylate or acrylate groups. Also suitable are binding agents which have one or more free carboxyl groups and/or hydroxyl groups and/or amino groups and accordingly permit a reaction with the metal complex and/or the functionalised organosilane.

Preferably the functional groups of the binding agent can be reacted with the preferably functionalised surface of the pigments and/or with the metal complexes, forming chemical bonds. In accordance with the invention the term chemical bond is used to denote a covalent bond, ion bonds, hydrogen bonding or complexing.

In addition it is also possible to use the organofunctional silanes described in WO 93/08006 as a binding agent.

The proportion of binding agent in the coating composition should not be selected to be excessively high as otherwise the vapor permeability of the coatings could suffer.

Good vapor permeability is important for long weathering times as otherwise coatings could split off due to water migrating below them. The binding agent is preferably contained in the coating agent in proportions of between 10 and 20% by weight with respect to the total weight of the coating agent.

It is possible to use binding agents both for aqueous and also for solvent-bearing dispersions. Particularly preferred however are binding agents for aqueous systems.

Examples of such binding agents are as follows: Mowilith LDM wood glazes (acrylate system which can be obtained from Clariant GmbH, Division CP, Am Unionspark 1, D-65843 Sulzbach am Taunus, Germany), Primal AC 337 (acrylate dispersion which can be obtained from Rohm & Haas, In der Kron 4, D-60489 Frankfurt, Germany), or Necowel 6262, Necowel 2275, Necowel 2329 or Necowel 5088 AMP (polyurethane modified alkyd resin dispersion; which can be obtained from Ashland-Südchemie-Kernfest GmbH, Hildenstrasse 16-18, Postbox 440, D-40721 Hilden, Germany).

The coating agent preferably has a solids content of between 10 and 35% by weight, preferably between 15 and 30% by weight with respect to the total weight of the coating agent.

The content of metal pigment in the coating agent is between 2 and 20% by weight, preferably between 4 and 16% by weight, with respect to the total weight of the coating agent.

Preferably the ratio of platelet-shaped pigments to binding agent is relatively high and is preferably in a range of between 1:5 and 1:1 with respect to the respective proportions by weight.

In accordance with a particularly preferred embodiment the coating agent may contain additives such as for example fungicides, thickening agents, anti-foam agents, dissolution aids, anti-settlement agents, further auxiliary binding agents and so forth. The nature and the amount of those added, optionally used additives correspond in that respect to the state of the art.

Furthermore it is also possible to add insecticides and/or algicides.

The coating agent according to the invention is advantageously a 1C-system (one-component system) which hardens after application without the addition of a further component. Hardening is effected after evaporation of inhibiting additives such as for example ammonia or volatile amines. The basic structure of 1C-systems is known to the man skilled in the art.

The cellulose-containing substrate is in particular wood or wood-like fibers. In that respect the OH-functions of the cellulose can react with OH-functions of the metal complex, with condensation, and form stable bonds.

The coating composition according to the invention is used as a weathering-stable primer for coating wood or wood-like fibers. The invention accordingly also concerns coated substrates and substrate surfaces produced using the coating agent according to the invention, such as for example coated wood panels, wood posts, coated building materials of wood, and so forth.

The layer thickness of a coating according to the invention which is applied to a substrate surface is extremely advantageously very thin at about between 10 μm and 50 μm, preferably between 20 μm and 45 μm, further preferably between 30 μm and 45 μm. In the state of the art covering coatings involve a layer thickness of 100 μm and more, which are expensive and easily peel off. The coating agent according to the invention advantageously permits a considerable saving in terms of coating material.

The invention is further described hereinafter by reference to some examples. These examples however are in no way to be considered as limiting the scope of protection of the invention.

EXAMPLES

Example 1

Production of a Metal Complex for Use in the Coating Agent According to the Invention 2 g of montan wax acid (which can be obtained from Clariant GmbH, Germany (see above)) and 0.6 g of silicone resin emulsion bearing the designation Silikophen P40/W (which can be obtained from Tego, Essen, Germany) are added with agitation to 94 g of water. The suspension obtained is heated to between 70° C. and 75° C. Added to the heated suspension is an equimolar amount of 2-amino-2-methylpropan-1-ol with agitation at 2000 rpm and the reaction mixture is neutralised. A small excess of ammonia is then added. The reaction mixture is then cooled to 30° C. and 3.4 g of ammonium zirconium carbonate is added, with careful agitation. After about 1 hour complexing is concluded. The complex produced can be used without further processing in the coating agent according to the invention.

Example 2

Production of a Coating Agent According to the Invention 400 g of HF-200 (metal complex), 200 g of HF 2253 (anti-settlement agent) (HF-200 and HF 2253 can both be obtained from Böhme AG, Switzerland (see above)) are mixed with intensive agitation with 225 g of Necowel 5088 (this can be obtained from Ashland-Südchemie-Kernfest GmbH, Germany (see above)) and 150 g of Mowilith LDM 7416 (which can be obtained from Clariant GmbH (see above)). A viscosity of between 19 and 20 seconds in a DIN 4 delivery beaker is set by the addition of 250 g of water. Added with agitation to that mixture is 100 g of Stapa® IL Hydrolan 212 VP 54666/G (which can be obtained from Eckart GmbH & Co KG, D-91235 Velden, Germany: a paste with aluminum pigments coated with about 5% by weight of $SiO_2 \cdot nH_2O$). The coating agent according to the invention produced in that way can be used directly for coating purposes.

Example 3

Artificial Weathering Testing of Coated Samples

Spruce sample boards (21×9 cm) were coated by means of brush application, as specified in Table 1. In that procedure firstly one or two primer layers (P) and then one or two cover layers (C) were applied, as specified in the column 'Coating structure'. In all three coatings were applied in each case.

After application of the respective primer the coating was left to dry for 24 hours at room temperature. The cover layers were then applied.

TABLE 1

| Sample No | Coating structure | Layer thickness (μm) |
|---|---|---|
| 1 | P: 1 × Lignol WAB<br>C: 2 × Perl-Color mordant glaze PC-9, walnut | 17 |
| 2 | P: 1 × Lignol WAB<br>C: 2 × Satin-Color thick-layer glaze SC-9, walnut | 15 |
| 3 | P: 1 × Lignol WAB<br>C: 2 × Perl-Color + 10% Stapa ® IL Hydrolan 212 | 17 |
| 4 | P: 1 × Perl-Color, gray<br>C: 2 × Perl-Color, gray | 15 |
| 5 | P: 1 × ASS-Grund, white<br>C: 2 × Satin-Color FF-5000, window paint RAL 9010 | 114 |
| 6 | P: 2 × Perl-Color PC-9, walnut<br>C: 1 × Aqua-stop satin | 29 |
| 7 | P: 2 × Perl-Color + 10% Stapa ® IL Hydrolan 212<br>C: 1 × Aqua-Stop satin | 42 |
| 8 | P: 2 × Perl-Color + 10% Stapa ® IL Hydrolan 212<br>C: 1 × Aqua-Stop matt | 21 |
| 9 | P: 1 × Perl-Color + 10% Stapa ® IL Hydrolan 212<br>C: 2 × Perl-Color + 10% Stapa ® IL Hydrolan 212 | 28 |
| 10 | P: 1 × Perl-Color mordant glaze PC-9, walnut<br>C: 2 × Perl-Color mordant glaze PC-9, walnut | 16 |

The coating agents Lignol WAB, Aqua-Stop satin, Aqua-Stop matt, Perl-Color gray, Perl-Color mordant glaze PC-9 walnut, Satin-Color thick-layer glaze SC-9 walnut, ASS-Grund white, Satin-Color FF-5000 window paint RAL 9010 can be obtained from Böhme AG, Switzerland (see above) and do not contain any platelet-shaped pigments.

The Perl-Color paint system can be obtained from Böhme AG, Switzerland (see above). Added to that system were platelet-shaped aluminum pigments (Stapa® IL Hydrolan 212 VP 54666/G (size of the pigment platelets: 60 μm), which can be obtained from Eckart GmbH & Co KG (see above)). Hereinafter that mixture is referred to as Perl-Color+10% Stapa® Hydrolan 212. The proportion of Stapa® Hydrolan 212 in the Perl-Color mixture was 10% by weight of a paste with 65% by weight solids content and 35% by weight of isopropanol. The aluminum pigment comprises about 95% by weight aluminum and 5% by weight $SiO_2 \times nH_2O$. The final concentration of aluminum pigment in the Perl-Color+10% Stapa® Hydrolan 212 is about 6% by weight.

The above-mentioned coating agents 1 through 10 each contain the metal complex HF-200 (which can be obtained from Böhme AG, Switzerland (see above)) in an amount of 40% by weight.

The sample boards were subjected to rapid weathering based on ENISO 11507 with a QUV apparatus. The tests were carried out by the Eidgenössische Materialprüfungs- und Forschungsanstalt (EMPA) ['Swiss Confederate Material Testing and Research Institute'], Überlandstrasse 129, 8600 Dübendorf/Switzerland. The QUV apparatus was obtained from Q-Panel Corporation of Cleveland, Ohio/USA and modified for investigating wood samples, as described in J Sell and K Weiss, Apparat für die künstliche Bewitterung von Holz und Holzanstrichen, farbe+lack, 6/1989, pages 417-418. In that procedure the sample boards were firstly conditioned for a week at 23° C. and 50% relative air humidity. The sample boards were then weathered for 2400 hours with the following week cycle in a QUV apparatus:
covering with dew for 24 hours at 45° C.
6 days:
  alternately:
    2.5 hours UV radiation at 60° C.
    0.5 hours spraying with water.

The result of artificial weathering is set forth in Table 2. Assessment was effected visually, the weathered samples being compared to an unweathered standard. The following evaluation scale was used:
0: no visible change
1: slightly visible change
2: clearly visible change
3: strongly visible change
4: very strongly visible change
5: visible change over the entire sample surface

TABLE 2

| | Result of rapid weathering | | |
|---|---|---|---|
| Sample No | Loss of shine | Loss of adhesion | Chalking |
| 1 | 2-3 | 2-3 | 0-1 |
| 2 | 1-2 | 0-1 | 0-1 |
| 3 | 0 | 0 | 0 |
| 4 | 3-4 | 0 | 1-2 |
| 5 | 1-2 | 0 | 0-1 |
| 6 | 3-4 | 2-3 | 0-1 |
| 7 | 0-1 | 0 | 0* |
| 8 | 0-1 | 0 | 0* |
| 9 | 0 | 0 | 0 |
| 10 | 1-2 | 0 | 0-1 |

*samples Nos 7 and 8 were somewhat paler than sample No 9.

The samples coated with aluminum pigments (samples Nos 3, 7, 8 and 9) were found to be particularly resistant and presented the best result. Surprisingly samples Nos 3 and 9 which do not have any further cover layer without aluminum pigment over the aluminum-bearing coating presented the best results. The fact that the shine is maintained shows that no oxidation of the aluminum pigments took place. In addition, none of samples Nos 3, 7, 8 and 9 suffered from a loss in adhesion in the form of visually detectable detachments or flaking off.

To sum up it is to be noted that the coating agents which contain platelet-shaped pigments exhibited a marked improvement in terms of weathering stability, in relation to the comparative samples.

Example 4

Open-Air Weathering of Coated Wood Panel Portions

The following coating agents (A) through (E) were used:
(A): Perl-Color+10% Stapa® Hydrolan 212 (particle size 60 μm), same composition as in Example 3 above
(B): Perl-Color+10% Stapa® Hydrolan 212 (particle size 60 μm), same composition as in sample (B), but without metal complex HF 200
(C): Perl-Color+10% Stapa® Roto Vario Aqua 610012 (particle size 18 μm, this involves an aluminum pigment which is only limitedly stabilised in respect of corrosion by organic additives but which has no corrosion-resistant coating. The aluminum pigment Roto Vario Aqua 610012 is usually employed in printing inks)

(D): Glaze paint of Perl-Color with 4% by weight covering TiO$_2$ pigments TRONOX CR-800 (this can be obtained from Kerr McGEE) and 2% by weight of micronised transparent TiO$_2$ pigments Hombitec RM 400 WP (can be obtained from Sachtleben (see above)). (The TiO$_2$ pigments involve shapeless to spherical pigments, but not platelet-shaped pigments)

(E): Glaze paint of Perl-Color with 4% by weight covering iron oxide yellow pigments COLANYL oxide yellow R 131 (this can be obtained from Clariant GmbH (see above)) and 4% by weight of micronised transparent iron oxide yellow pigments Napronyl-Tr. oxide yellow L 8020 (this can be obtained from Clariant GmbH (see above)). (The iron oxide yellow pigments involve shapeless to spherical pigments, but not platelet-shaped pigments).

The coating agents (A) through (E) were produced by the specified pigments being introduced in the specified amounts into the Perl-Color lacquer system. With the exception of coating agent (B) the Perl-Color contained in each case the metal complex HF 200.

Spruce sample boards were coated with the above-mentioned coating agents under identical conditions. The coated sample boards were exposed to open-air weathering for several years.

Open-Air Weathering Conditions:
Location: Bern-Liebefeld, Switzerland
Residential area without large-scale industry
45° angle, direction South West
no standard The results are shown in Table 3, in which respect evaluation was effected visually using the evaluation scale specified in relation to Table 2.

TABLE 3

| Sample No | Duration | Shine loss | Adhesion loss | Chalking |
|---|---|---|---|---|
| (A) | 4 years | 0 | 0 | 0 |
| (B) | 2 years* | 0 | 2-3 | 0 |
| (C) | 2 years* | 2 | 1 | 0-1 |
| (D) | 2 years* | 3 | 3 | 3 |
|  | 4 years* | 3-4 | 3-4 | 3-4 |
| (E) | 2 years* | 2-3 | 2-3 | 2 |

*the samples were taken from the weather location after the specified years.

Some of the sample boards coated with the coating agent (D) were taken from the weather location after 2 years. A further part of the sample boards coated with the coating agent (D) were taken from the weather location after 4 years.

The results shown in Table 3 are in conformity with the results obtained in Example 3 in rapid weathering. The coating agent (A) was markedly superior to the coating agents (B) through (E) which were further used for comparative purposes.

It can be seen from the direct comparison of the coating agents (A) and (B) that the use of the metal complex (HF 20) has a very great improvement in relation to adhesion of the applied coating.

The result of the coating agent (C) used shows that the use of corrosion-resistant pigments is of very great significance. In the case of the coating agent (C), a severe loss of shine due to corrosion already occurred after two years. Unlike the aluminum pigments used in the coating agent (C) the aluminum pigments used in the coating agent (A) are completely coated with a corrosion-resistant silicate coating.

The results of the coating agents (D) and (E) used show that the use of platelet-shaped pigments is of very great significance. In the case of the coating agents (D) and (E), very poor results were obtained on all evaluation points.

In addition it was found that the wood boards coated with the coating agent (A) according to the invention had surprisingly little fouling and contamination of the surface. The coatings produced using the coating agent (A) according to the invention accordingly have a self-cleaning effect.

Therefore the coating agent according to the invention is also suitable for the production of substrate surfaces with a dirt-repellent surface or surfaces with a self-cleaning effect.

Extremely effective UV protection is provided by virtue of the reliable adhesion of the coating agent according to the invention to cellulose-bearing surfaces and the resistance, for many years, of the coating produced.

The invention claimed is:

1. A coating agent for cellulose-bearing substrate surfaces comprising a liquid phase and binding agent, characterised in that the coating agent includes platelet-shaped pigments and a bonding agent, wherein the platelet-shaped pigments are corrosion-resistant and impermeable to UV light and wherein the bonding agent is capable of producing a bond between platelet-shaped pigments, binding agent and the cellulose-bearing substrate surface, characterised in that the bonding agent is a metal complex with one or more organic ligands, wherein the metal complex contains one or more metal cations which are selected from the group consisting of B, Al, Si, Ge, Sn, Pb, Ti, Zr, V, Cr, Mo, Mn, Fe, Zn and mixtures thereof and the metal complex has at least two functional groups or ligands which with hydroxyl groups form a complex or produce a covalent bond or are displaced out of the complex by hydroxyl groups with the formation of an oxygen-central cation bond.

2. A coating agent as set forth in claim 1 characterised in that the platelet-shaped pigments are metal pigments with a corrosion-resistant coating.

3. A coating agent as set forth in claim 2 characterised in that the corrosion-resistant coating is selected from the group consisting of an aluminum oxide layer, a silicate layer, a chromium oxide-bearing layer, an acrylate layer and two or more layers thereof arranged one above the other.

4. A coating agent as set forth in claim 2 or claim 3 characterised in that the metal pigments are produced from metals and/or metal alloys which are selected from the group consisting of aluminum, zinc, tin, copper, iron, titanium, and alloys thereof steel alloys and gold-bronze alloys.

5. A coating agent as set forth in claim 4 characterised in that the metal pigments are silicate-coated.

6. A coating agent as set forth in claim 1 characterised in that a functionalised silane surface-modifying agents is applied to the corrosion resistant coating of the pigments.

7. A coating agent as set forth in claim 3 characterised in that colour pigments are additionally incorporated into the corrosion resistant coating.

8. A coating agent as set forth in claim 1 characterised in that the corrosion-resistant platelet-shaped pigments are substantially circular or oval and are of a maximum diameter of between 1 and 250 µm.

9. A coating agent as set forth in claim 1 characterised in that at least two hydrolysable inorganic or organic ligands or two hydroxyl ions are co-ordinated on the one metal cation or the plurality of metal cations of the metal complex.

10. A coating agent as set forth in claim 1 or claim 9 characterised in that at least one organic ligand is co-ordinated on the one metal cation or the plurality of metal cations of the metal complex by way of a carboxyl group or a plurality of carboxyl groups.

11. A coating agent as set forth in claim 1 characterised in that at least one organic ligand is hydrophobic.

12. A coating agent as set forth in claim 1 characterised in that at least one organic ligand has at least one reactive functional group.

13. A coating agent as set forth in claim 1 characterized in that the metal complex can be obtained by the following steps:
   (a) neutralising a carboxylic acid which has between 3 and 30 carbon atoms, with a volatile basic nitrogen compound,
   (b) adding at least one water-soluble salt of a metal which is selected from the group consisting of B, Al, Si, Ge, Sn, Pb, Ti, Zr, V, Cr, Mo, Mn, Fe, Zn and mixtures thereof, to the mixture from step (a), and
   (c) optionally adding a volatile basic nitrogen compound, to the mixture from step (b).

14. A coating agent as set forth in claim 1 characterized in that the bonding agent is a functionalized organosilane $R_nSiX_{4-n}$, wherein n=between 0 and 2 and R stands for a substituted or unsubstituted organic residue, and X stands for functional groups and/or for substituted or unsubstituted organic residues which form complexes with hydroxyl groups and/or react with hydroxyl groups forming a covalent bond and/or are displaced out of the organosilane by hydroxyl groups with the formation of an oxygen-silicon bond.

15. A coating agent as set forth in claim 14 characterized in that contained in the coating agent further comprises as a bonding agent a metal complex with one or more organic ligands, wherein the metal complex contains one or more metal cations which are selected from the group consisting of B, Al, Si, Ge, Sn, Pb, Ti, Zr, V, Cr, Mo, Mn, Fe, Zn and mixtures thereof and the metal complex has at least two functional groups or ligands which with hydroxyl groups form a complex or produce a covalent bond or are displaced out of the complex by hydroxyl groups with the formation of an oxygen-central cation bond.

16. A coating agent as set forth in claim 1 characterized in that the liquid phase is selected from the group which consists of water, aqueous phase, organic solvent or mixtures thereof.

17. A coating agent as set forth in claim 12 characterized in that the at least one ligand with the at least one reactive functional group is reacted with aminofunctional silicone oil, silicone resin or carboxylfunctional wax.

18. A coating agent as set forth in claim 1 characterized in that the coating agent additionally contains a reactive binding agent with at least one free carboxyl group, hydroxyl group and/or amino group.

19. A coating agent as set forth in claim 1 characterized in that contained in the coating agent are between about 2 and about 20% by weight of corrosion-resistant pigments, with respect to the total weight of the coating agent.

20. A coating agent as set forth in claim 1 characterized in that contained in the coating agent is between about 10% by weight and 20% by weight of binding agent, with respect to the total weight of the coating agent.

21. A coating agent as set forth in claim 1 characterized in that the total solid content in the coating agent is between about 10 and 35% by weight, with respect to the total weight of the coating agent.

22. A coating agent as set forth in claim 1 characterized in that the coating agent further contains one or more additives selected from the group consisting of fungicides, insecticides, algicides, thickening agents, anti-foam agents, anti-settlement agents, auxiliary binding agents and dissolution aids.

23. A coating agent as set forth in claim 1 characterized in that the cellulose-bearing substrate surface contains wood, wood chip-bearing materials, paper and/or paper-bearing materials.

24. A method for coating cellulose-bearing substrate surfaces, comprising applying to said surface a coating agent according to claim 1.

25. The method of claim 24, wherein said method comprises priming cellulose-bearing substrate surfaces for the production of weathering-stable building elements and facade claddings.

26. A cellulose-bearing substrate surface characterized in that the substrate surface is coated with a coating agent as set forth in claim 1.

27. A cellulose-bearing substrate surface as set forth in claim 26 characterized in that the substrate surface is the surface of wood material, wood-bearing material, paper, paper-bearing material or chemically and/or physically modified wood material.

28. A coating agent as set forth in claim 4, characterized in that the metal pigments are produced from gold-bronze.

29. A coating agent as set forth in claim 7, characterized in that the corrosion-resistant coating is a silicate layer.

30. A coating agent as set forth in claim 8, characterized in the maximum diameter of the platelet-shaped pigments is between 5 μm and 70 μm.

31. A coating agent as set forth in claim 13, characterized that the volatile basic nitrogen compound is ammonia or a volatile amine compound.

32. A coating agent as set forth in claim 14, characterized in that R is alkyl, aryl, alkylaryl, or arylalkyl.

33. A coating agent as set forth in claim 16, characterised in that the liquid phase is a mixture which substantially comprises water.

34. A coating agent as set forth in claim 19, characterized by the coating agent comprising between about 4 and about 20% by weight of corrosion-resistant pigments with respect to the total weight of the coating agent.

35. A coating agent as set forth in claim 21, characterized in that the total solid content of the coating agent is between about 15 and about 30% by weight with respect to the total weight of the coating agent.

36. A method as set forth in claim 24, characterized in that the cellulose bearing substrate surface is selected from wood, wood-chip containing materials, paper, or paper-bearing materials.

37. A method as set forth in claim 36, characterized in that the cellulose bearing substrate surface is a wood or wood-chip-containing building material.

* * * * *